United States Patent [19]

Ogino

[11] Patent Number: 4,961,642
[45] Date of Patent: Oct. 9, 1990

[54] PROJECTION TYPE DISPLAY DEVICE FOR MONITORING AT SHORT DISTANCE
[75] Inventor: Masanori Ogino, Yokohama, Japan
[73] Assignee: Hitachi, Ltd., Tokyo, Japan
[21] Appl. No.: 374,147
[22] Filed: Jun. 30, 1989
[30] Foreign Application Priority Data Jul. 18, 1988 [JP] Japan .................................. 63-177125

[51] Int. Cl.⁵ .................. G03B 21/60; G03B 21/14
[52] U.S. Cl. ...................................... 353/38; 350/127; 350/128; 353/74
[58] Field of Search ..................... 353/74, 38; 350/128, 350/127; 358/60, 231

[56]  References Cited

U.S. PATENT DOCUMENTS

| | | | |
|---|---|---|---|
| 3,580,661 | 5/1971 | Cooper, Jr. ........................... | 350/128 |
| 4,531,812 | 7/1985 | Oguino .............................. | 350/128 |
| 4,536,056 | 8/1985 | Ogino ................................ | 350/128 |
| 4,701,020 | 10/1987 | Bradley, Jr. ......................... | 350/128 |
| 4,725,134 | 2/1988 | Ogino .................................... | 353/74 |
| 4,752,116 | 6/1988 | Sekiguchi ............................. | 350/128 |
| 4,773,731 | 9/1988 | Goldenberg et al. ................ | 350/128 |

Primary Examiner—William A. Cuchlinski, Jr.
Assistant Examiner—William C. Dowling
Attorney, Agent, or Firm—Antonelli, Terry, Stout & Kraus

[57] ABSTRACT

The present invention relates to a projection type display device wherein images based on light projected form a projection source are formed on a screen. The screen is composed of two Fresnel sheets and one lenticular sheet so that the display device can be monitored at a short distance, more specifically at a short distance within about twice the height of the screen. The light from the projection source is converged at the short distance. The lenticular sheet diffuses the light in the horizontal direction.

5 Claims, 8 Drawing Sheets

PROJECTION TYPE DISPLAY DEVICE FOR MONITORING AT SHORT DISTANCE

BACKGROUND OF THE INVENTION:

The present invention relates to a projection type display device and more particularly to a projection type display device of high fineness suitable for monitoring at a short distance and applicable to, for example, a personal work station.

Recently, personal work stations having a fineness not lower than 1,000 lines×1,000 dots, i.e. 1M pixels, have been becoming popular. As a display device for this type of work stations there has heretofore been used a direct viewing type CRT display.

On the other hand, for work stations there has been a demand for a large screen display and the use of a projection type display device may be one means for meeting such demand. An example of a projection type display device is disclosed in U.S. Pat. No. 4,536,056.

In a direct viewing type display device, light is reflected (several percent) by the front and the back of a glass panel, so the contrast is deteriorated, making pictures difficult to see, under the influence of ambient illumination light entering the glass panel.

In the projection type display device described in the specification of the aforementioned U.S. patent, the anti-ambient light contrast characteristic is improved by a black stripe screen technique, but this display device is for monitoring by a number of people from afar, not suitable for monitoring at a short distance.

The reason why such projection type display device is not suitable for monitoring at a short distance is mainly because its vertical directional angle is as narrow as about ±6° to ±8° and the greater part of emitted light is locally distributed nearly in the normal direction from the screen.

The applicant in the present case possesses the following U.S. patents relating to a projection type television/display screen:
U.S. Pat. No. 4,478,902
U.S. Pat. No. 4,531,812
U.S. Pat. No. 4,536,056
U.S. Pat. No. 4,576,442
U.S. Pat. No. 4,725,134
also possesses and has filed the following U.S. patents and applications using an optical system:
U.S. Pat. No. 4,609,945
U.S. Pat. No. 4,729,031
U.S. Ser. No. 715,950 (March 1985)
U.S. Ser. No. 911,070 (September 1986)
U.S. Ser. No. 277,431 (November 1988)
further possesses the following U.S. patents using a deflecting yoke:
U.S. Pat. No. 4,420,734
U.S. Pat. No. 4,433,318
and has filed the following application relating to a television itself:
U.S. Ser. No. 948,251 (December 1986)

SUMMARY OF THE INVENTION

It is an object of the present invention to remedy the above-mentioned drawbacks of the prior art and provide a projection type display device suitable for monitoring at a short distance within about twice, preferably about 1.5 times, the height of the screen.

It is another object of the present invention to provide a display device wherein the contrast deterioration caused by ambient light is reduced.

The reason for the above "preferably 1.5 times" is that the eyesight of a normal person is 1.0 and this corresponds to a discrimination limit requiring a watching effort corresponding to an angle of 1' (about 3 mrad). More particularly, when 1,000 picture elements/H is monitored from 1.5H (H: screen height), the angle per picture element is about 6 mrad, corresponding to twice the discrimination limit, that is, corresponding substantially to an easily understandable limit.

The foregoing objects can be achieved by using a screen comprising two Fresnel sheets means and one lenticular sheet means.

Light emanating macroscopically from a projection source toward the peripheral portion of the screen is converged at a distance of about 1.5H on the emission side by the two Fresnel sheets means. The lenticular sheet means, having a vertically striped lenticular lens construction, diffuses light at about ±30° or more microscopically in the horizontal direction and also diffuses light at about ±8° microscopically in the vertical direction under the action of diffusing particles incorporated therein.

The light exit side lenticular lens pitch of the lenticular sheet is selected smaller than the light incidence-side lenticular lens pitch so as not to disturb the emitted light converging action of the two Fresnel sheets. Black stripes are formed on the exit side lenticular lens surface to prevent the deterioration of contrast caused by ambient light.

Where, as the Fresnel sheet means, a linear Fresnel lens surface is formed on an upper half light incidence side of the same means and a like lens surface formed on a lower half light exit side thereof, the outgoing light is converged at a distance of about 1.5 times the screen height by the action of the linear Fresnel lenses. And since the Fresnel lens surfaces are formed so as to be inclined downwards at all times, the light from an illumination source positioned above is reflected downwards, not in the direction of the monitor's eyes, so the deterioration of contrast is prevented.

DETAILED DESCRIPTION OF THE PREFERRED EMBODIMENTS

Figure 1:
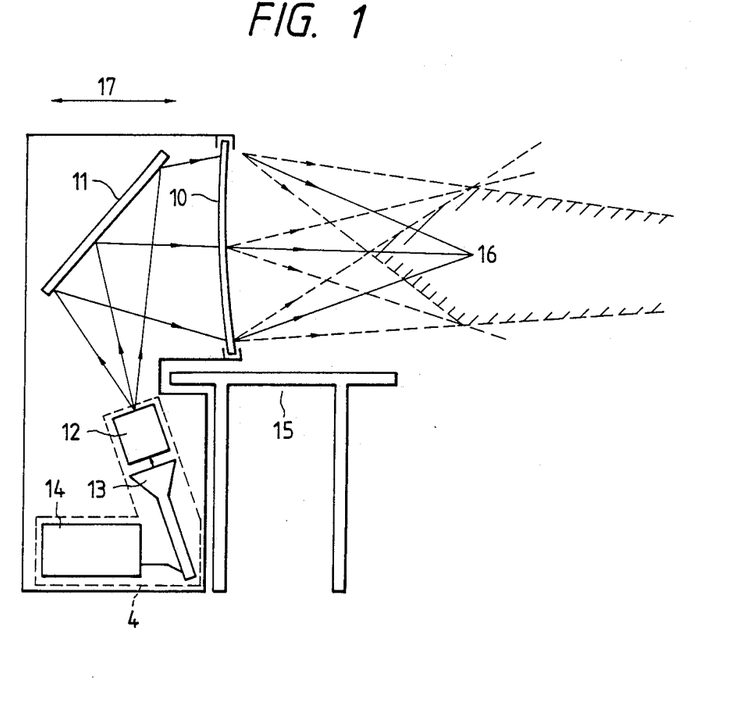
FIG. 1 is a construction diagram of a projection type display device according to the present invention.

FIG. 1 is a construction diagram of the whole of a projection type display device according to the present invention, in which the reference numeral 10 denotes a screen having a diagonal length of about 40", the screen 10 being composed of three sheets as will be described later. The numeral 11 denotes a mirror. A projection lens 12, a projection tube 13 and a circuit 14 for projection are components of a projection source 4. Since FIG. 1 is a transverse sectional view, only one set of the projection source 4 is shown therein, but three sets of projection sources 4 are disposed side by side for three primary colors. Numeral 15 denotes a work desk. The area surrounded with a hatched frame 16 is a suitable viewing area, corresponding to the height of the eyes of the monitor when sat on a chair which is about 1.2 m. A cabinet portion below the screen has a recess of about 10 cm or larger formed in a light non-passing area. By inserting an end portion of the work desk into the said recess, a wide working area is ensured on the work desk and the distance between the screen and the monitor's eyes is made short enough to permit visual discrimination of details of a high fineness picture. The depth, indicated at 17, of the cabinet can be set at a value within about 50 cm as measured from an end portion of the work desk. Thus, the cabinet can be disposed in a small space of substantially the same depth as in a conventional direct viewing type 20" display device.

Figure 2A:
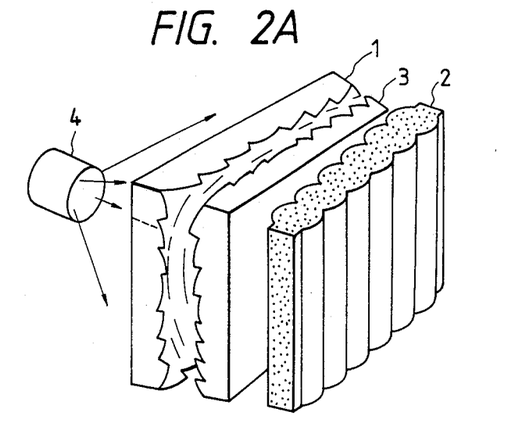
FIG. 2A is a perspective view of a first embodiment of the present invention.

FIG. 2A is a perspective view showing the construction of a screen according to a first embodiment of the present invention, in which the numerals 1, 2, 3 and 4 denote a first spiral Fresnel sheet, a lenticular sheet, a second spiral Fresnel sheet and a projection source, respectively. The spiral Fresnel sheets 1, 3 and the lenticular sheet 2 constitute a screen means.

Black stripes are applied vertically to the lenticular sheet 2, though not shown.

The projection source 4 comprises a display circuit, a projection tube and a projection lens. Although only one set of the projection source 4 is shown in FIG. 2A, three sets of projection sources are actually disposed side by side in the horizontal direction for the three primary colors of red, green and blue, respectively, whereby a composite color picture is projected and formed on the screen. The screen as a whole has a thickness of about 4 mm and a diagonal length of about 40". It is in a disassembled state in the same figure for easier understanding.

The lens surface of the second spiral Fresnel sheet 3 is formed on the incident side in contrast with the first spiral sheet 1.

The operation of this embodiment will be described below.

Figure 2B:
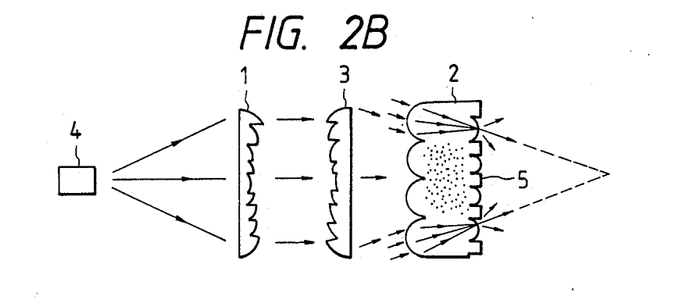
FIG. 2B is a horizontal sectional view of FIG. 2A.

FIG. 2B is a horizontal sectional view of FIG. 2A, in which the numeral 5 denotes a black stripe portion. Incident light emanating macroscopically from the projection source 4 toward the peripheral portion of the screen is converted into macroscopic parallel rays by the first spiral Fresnel sheet 1. Then, by the second spiral Fresnel sheet 3 the said parallel rays are converged toward an exit-side conjugate point located at a distance of about 1.5H. This light substantially holds its macroscopic direction through the lenticular sheet 2, while microscopically it is diffused horizontally in a wide range of about ±30° or more. Therefore, the exit light has a substantially uniform directionality over ±30° or more right and left with respect to the direction toward the conjugate point.

Figure 2C:
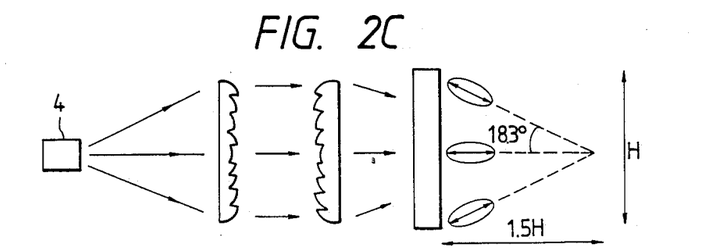
FIG. 2C is a vertical sectional view of FIG. 2A.

FIG. 2C is a vertical sectional view of FIG. 2A, in which the light from the projection source 4 is converted to parallel rays macroscopically by the first spiral Fresnel lens 1 and then converged toward a conjugate point at a distance of about 1.5H by means of the second spiral Fresnel lens 3.

The spiral Fresnel sheets 1 and 3 are set at an F number of about 1.5. The converged light is diffused in the range of about ±8° with respect to the direction toward the conjugate point by a finely powdered diffusing material such as $SiO_2$ contained in the lenticular sheet 2.

Figure 3:
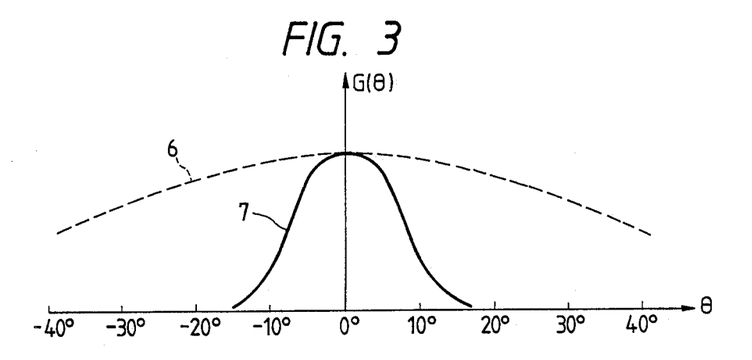
FIG. 3 is a graph showing typical directionalities in the construction of the first embodiment of the present invention.

FIG. 3 is a graph showing typical directionalities in the construction illustrated in FIG. 2A. The axis of abscissa represents an angle with respect to a reference angle of 0° corresponding to the direction toward the conjugate point, while the axis of ordinate represents a directional angle. The numerals 6 and 7 represent a horizontal directionality and a vertical directionality, respectively.

As shown in FIG. 3, the whole of the screen, including its marginal portion, is seen at a uniform luminance by a monitor positioned at the conjugate point of 1.5H. Conversely, when monitored from afar, the upper and lower portions of the screen will become nearly deep black. But this is allowable because the screen is not used in such a way.

Figure 4:
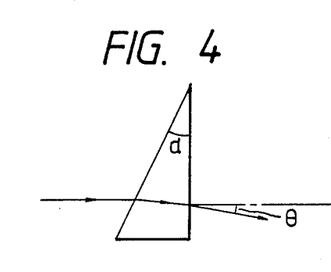
FIGS. 4, 5, 6 and 7 are views explanatory of incident angle/exit angle.

In the foregoing U.S. Pat. No. 4,536,056 it is described that the light exit-side conjugate point is shifted to a finite monitor position of about 6H to 8H by strengthening the power of the first spiral Fresnel sheet. The shift to about 6H can thereby be realized without secondary effect, but the shift to 4H or below is inappropriate as will be described later. Before making reference to the above, the relation between the Fresnel sheet prism angle α and on angle θ will now be explained with reference to FIGS. 4 and 5. The following relation exists between the two, assuming that the refractive index of the screen material is n (usually $n \approx 1.5$ in case of acrylic material). In case of incident side Fresnel of FIG. 4:

$$\tan\alpha = \frac{\sin\theta}{n\sin\left\{\cos^{-1}\left(\frac{\sin\theta}{n}\right)\right\} - 1} \tag{1}$$

Figure 5:
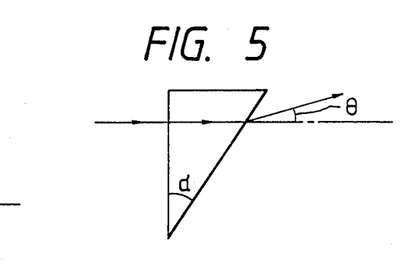

In case of exit side Fresnel of FIG. 5:

$$\tan\alpha = \frac{\sin\theta}{n - \cos\theta} \tag{2}$$

In case both being in the relation of $\theta < 1$ rad:

$$\alpha \approx \frac{\theta}{n-1} \tag{3}$$

Since the value of θ is determined from the light exit-side conjugate point position 1.5H and the ordinate on the linear Fresnel sheet, desired α values are obtained from the equations (1) and (2). The maximum value of $\alpha$ is determined to be 34°, assuming $n \approx 1.5$, from equation (1) and 30 from equation (2).

Description will now be made about the drawback involved in obtaining a 1.5H exit-side conjugate point by using only the spiral sheet 1 without using the spiral Fresnel sheet. The incident surface of the spiral Fresnel sheet is plane, so at a diagonal corner of the screen, light travels along such a path as indicated by a solid line in FIG. 6.

Figure 6:
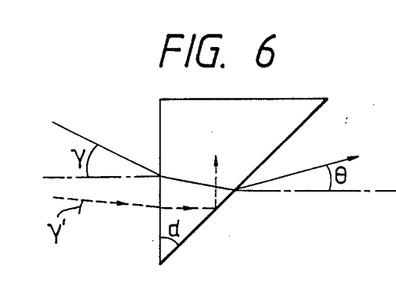

The mark $\gamma$ in the same figure represents an angle of view with respect to the projection source, which angle is about 35° at a diagonal corner, while the mark $\theta$ represents an angle with respect to the exit-side conjugate point 1.5H from the diagonal corner. Where the aspect ratio is 4:3, the distance from the center of the screen to the diagonal corner is as follows according to the Pythagorean theorem:

$$\sqrt{\left(\frac{H}{2}\right)^2 + \left(\frac{4}{3} \times \frac{H}{2}\right)^2} = \frac{H}{2} \times \frac{5}{3}$$

Thus, $$\tan\theta = \frac{\frac{5}{6}H}{1.5H} \approx 0.56 H$$

$$\therefore \theta = 29°$$

The $\alpha$ value in FIG. 6 is obtained by the following equation according to the Snell's law:

$$\tan\alpha = \frac{\sin\gamma + \sin\theta}{n\sin\left\{\cos^{-1}\left(\frac{\sin\gamma}{n}\right)\right\} - \sin\theta} \quad (4)$$

Substituting $\gamma = 35°$ and $\Delta = 29°$ into the above equation gives $\alpha \approx 50°$.

Figure 7:
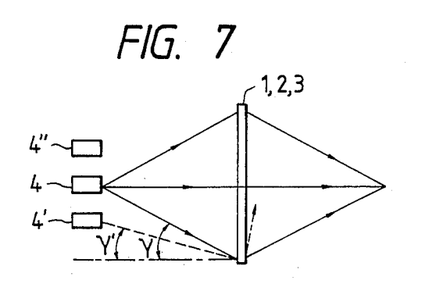

As to a green projection source, there is no special problem because it is centrally disposed as indicated at 4 in FIG. 7. However, the positions of red and blue projection sources are shifted right and left as indicated at 4' and 4'' in FIG. 7. Therefore, an angle of view $\gamma'$ is smaller by about 6° than that for the green projection source and consequently its optical path is as indicated by a dotted line in FIG. 6, thus causing a total reflection of the exit surface of the spiral Fresnel lens, whereby the red or blue light is lost at a diagonal corner. Consequently, the color purity is impaired grossly.

Thus, a change in the angle of incidence of only about 6° causes a great change in the direction of exit light, leading to a total reflection. This is because the Snell's law possesses an extremely strong non linear character near the total reflection conditions.

As previously mentioned in connection with FIG. 2C, the present invention is constructed so that the exit light from the spiral Fresnel sheet 1 becomes substantially parallel rays. Thus, there is a sufficient margin with respect to the total reflection conditions, so it is possible to overcome the drawback of the above two-sheet type screen.

In the specification of the foregoing U.S. patent it is described that the vertical directional angle can be expanded efficiently by using a lateral-striped lenticular lens which diffuses light in the vertical direction, in place of the second spiral Fresnel sheet 3 used in this embodiment. However, when a vertical diffusion angle of about $\pm 18°$ is to be obtained according to such technique, light is diffused in a range about two times or more as wide as that in the present invention, so that the screen gain thereof becomes about half or less as compared with that in this embodiment. In contrast therewith, this embodiment of the present invention is advantageous in that the desired object can be attained with light energy about half of that used in the above technique. Consequently, there is required only a half electron beam current to be passed through the projection tube and so there can be provided a picture of good focus while avoiding defocusing of the electron gun caused by excess beam current.

The following description is now provided about the method of setting the lens pitch of each of the three sheets used in this embodiment.

The pitch of the lenticular sheet 2 is set at a value not larger than about 85% of the picture element pitch on the display. Otherwise, it will become difficult to make discrimination of picture elements owing to the sampling effect in a finite period. In a 40" size display of not less than about 1,000 lines × 1,000 dots as a main object of the present invention, the pitch $P_2$ of the lenticular sheet is set at about 0.4 mm.

In a three-sheet screen, the moiré interference caused by the interference of periodicity between sheets is a serious problem. This is overcome in the following manner.

The most serious moiré interference occurs between the lenticular sheet 2 and the second spiral Fresnel sheet 3. In order to prevent this interference, the pitch $P_3$ of the second spiral Fresnel sheet is set at a value about $(\text{integer} + 0.5\text{v})^{-1}$ times the pitch $P_2$. Next, the pitch $P_1$ of the first spiral Fresnel sheet 1 is set at a value about $(\text{integer} + 0.5)^{-1}$ times the pitch $P_2$ and about $(\text{integer} + 0.5)$ or about $(\text{integer} + 0.5)^{31\ 1}$ times the pitch $P_3$.

Figure 8:
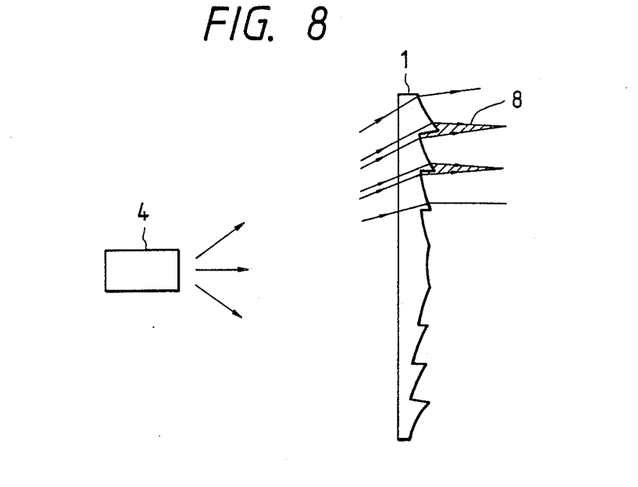
FIGS. 8 and 9 are explanatory views of a moiré interference reducing means.

Further, the means illustrated in FIG. 8 is effective for diminishing the moiré interference. In the same figure, the numeral 4 denotes a projection source and the numeral 1 denotes a first spiral Fresnel sheet corresponding to 1 in FIG. 2A. A lenticular sheet and a second spiral Fresnel sheet are omitted in FIG. 8.

Figure 9:
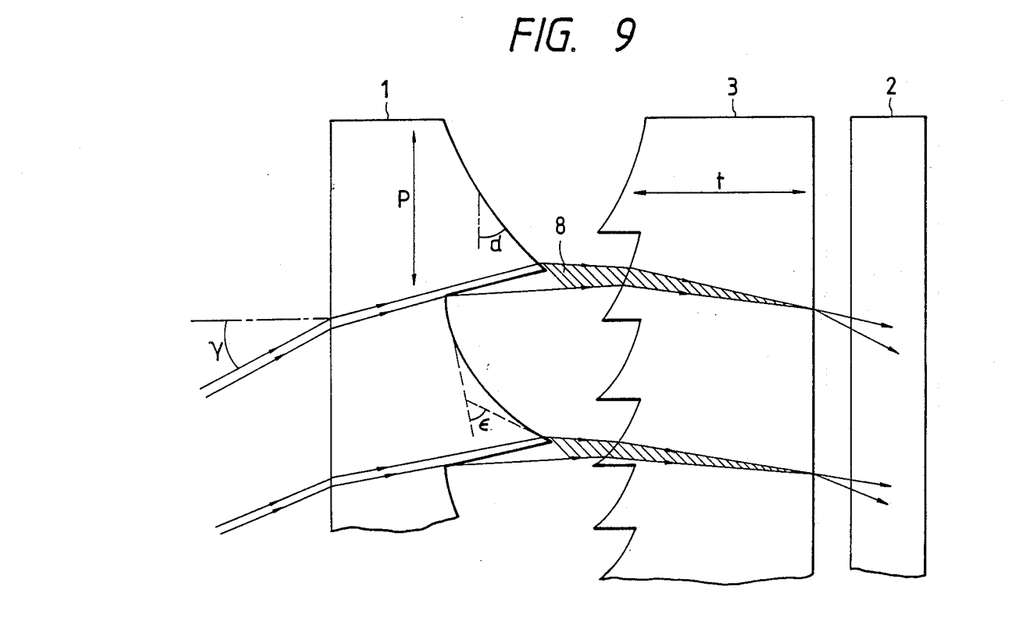

FIG. 9 is an enlarged view of a principal portion of FIG. 8. In FIG. 9, the numerals 1 and 3 each denote a spiral Fresnel sheet and the numeral 2 denotes a lenticular sheet. The lens portion of the lenticular sheet is omitted in the same figure. A fundamental cause of the moiré interference is that the hatched portion in FIG. 8, namely, a lightless area, is present periodically in the parallel exit rays from the first spiral Fresnel sheet 1. If this light is transmitted in a finite width up to the lenticular sheet 2, the moiré interference will occur.

For extinguishing the above lightless area until reaching the lenticular sheet 2, a lens surface 1' is concaved microscopically, as shown in FIG. 9. The intensity of that concave lens is represented in terms of an angle $\epsilon$ shown in the same figure. When the angle $\epsilon$ (rad) satisfies the following condition, the moiré interference is diminished:

$$(n-1)\epsilon t \geq 0.5\ P_1 d \ldots \quad (5)$$

where,
n: refractive index of the screen material,
$n \approx 1.5$
t: thickness of the sheet 3

$P_1$: period of the sheet 1
d: duty factor of the lightless area

The left side of the above expression (5) represents the amount of reduction of the lightless area in section t attained by the concave lens, while the right side $P_1 d$ represents the original lightless area width. The value of d is given by the following equation, though the process is omitted, according to the Snell's law:

$$d = \frac{\tan\alpha}{\tan\alpha + \tan\left\{\cos^{-1}\left(\frac{\sin\gamma}{n}\right)\right\}} \quad (6)$$

In the above equation, $\gamma$ and $\alpha$ represent an angle of view and a prism angle, respectively, in FIG. 9. The value of $\alpha$ is determined, assuming $\theta = 0$, from the above equation (4). As an actual example, substitution of $\gamma \approx 20°$ at the right and left ends of the screen gives $\alpha = 37°$ and the lightless area ratio, d, is determined to be 0.15 (15%).

The following table shows concrete examples of numerical values of each sheet.

| | External form | Thickness | Pitch |
|---|---|---|---|
| Sheet 1 | 80 cm × 60 cm | 3 mm | 0.17 mm |
| Sheet 2 | 80 cm × 60 cm | 0.5 mm | 0.4 mm |
| Sheet 3 | 80 cm × 60 cm | 0.5 mm | 0.25 mm |

The value of z is determined from the equation (5) by substitution of the above values, namely:

$$\epsilon \geq \frac{P_1 d}{(n-1)t} = \frac{0.17 \text{ mm} \times 0.15}{0.5 \times 0.5 \text{ mm}} \approx 0.1 \text{ rad} = 5.7°$$

Thus, if the first Fresnel lens 1 is endowed with a concave lens action corresponding to about 5.7°, this is very effective in reducing the moiré interference. By so doing, light will emanate microscopically by about 2.9° pp. If the angle of divergence in the horizontal direction exceeds 10° pp, the exit light will be trapped by the black stripe portion 5 on the exit surface of the lenticular sheet 2 in FIG. 2, resulting in deterioration of the color purity. Since the angle of divergence in the above example is small, it is possible to reduce the moiré interference without deterioration of the color purity.

The microscopic concave lens at the exit surface of the sheet 1 in FIG. 2A has thus been described. This is also true of the incident surface of the second spiral Fresnel sheet 3.

Where the Fresnel surface of the second spiral Fresnel sheet 3 is formed not on the incident side but on the exit side, the moiré interference reducing effect will be extinguished. This is because a new lightless area will be developed just after the said exit surface and transmitted directly to the lenticular sheet 2, inducing moiré interference.

The pitch 0.17 mm of the sheet 1 is fully attainable by the present plastic molding technique.

The following detailed description is now provided about to what degree the exit/incidence pitch of the lenticular sheet 2 is to be reduced.

As shown in the lenticular sheet 2 in FIG. 2B, it is necessary to reduce the exit-side pitch. In FIG. 2B, the exit-side conjugate point is at the distance of 1.5H and the width of the screen is 4/3 H. Therefore, the vertical angle of the conjugate point is about ±24°. If this is calculated in terms of an internal angle of the lenticular sheet (n ≈ 1.5), the result is as follows according to the Snell's law:

$$\sin^{-1}\frac{\sin 24°}{1.5} \approx 16°$$

Since the thickness of the lenticular sheet 2 is 0.5 mm as shown in the foregoing table, the amount of reduction required for the exit-side lens width is:

0.5 mm × tan 16° × 2 = 0.29 mm

Since the lateral width of the screen is 800 mm, the rate of reduction, δ, is:

$$\delta = \frac{0.29 \text{ mm}}{800 \text{ mm}} = 360 \times 10^{-6}$$

The exit side of the lenticular sheet 2 is formed reducedly by an amount corresponding to the above reduction rate as compared with the incident side.

The first embodiment of the present invention has been described above.

Figure 10:
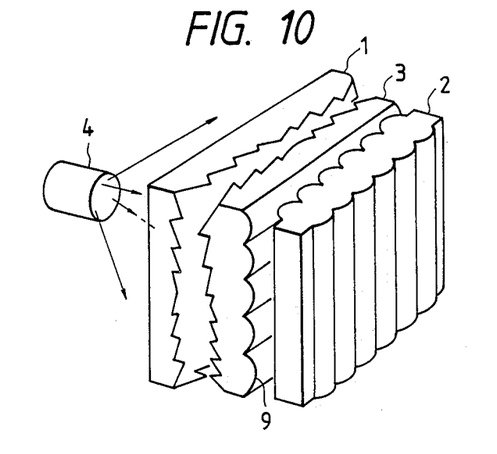
FIG. 10 is a perspective view of a second embodiment of the present invention.

FIG. 10 is a perspective view showing a construction according to a second embodiment of the present invention. The difference from the above first embodiment resides in that a lenticular lens 9 for diffusing light microscopically in the vertical direction is additionally provided on the exit side of the spiral Fresnel sheet 3 and also in that the density of the diffusing material particles in the lenticular sheet 2 is reduced to half or less. The other constructional points are the same as in the first embodiment. Although black stripes are actually formed on the exit surface of the lenticular sheet 2 as indicated at 5 in FIG. 2B to avoid complexity.

The pitch of the lenticular lens 9 is about 0.4 mm and the diffusion angle thereof is about ±8°.

As compared with the conventional two-sheet construction comprising only the sheets 1 and 2, the three-sheet construction of the present invention is characteristic in that the moiré interference is reduced to a great extent, as previously noted. Therefore, even if the amount of the diffusing material in the lenticular sheet 2 is reduced by utilization of such characteristic, the moiré interference will be slight. As the amount of the diffusing material is reduced, the propagation loss of light is diminished. In this case, however, the vertical diffusion angle becomes excessively small, so in order to prevent this inconvenience there is provided the lenticular lens 9. There can be obtained a screen gain about four times or more that in the prior art and hence it is possible to obtain a clear screen luminance which is about four times or more that of a direct viewing type display.

There is the problem that in transporting this three sheet type display device, the device may be flawed by sliding vibrations between the first and second spiral Fresnel sheets 1, 3 which constitute the screen. But this problem can be overcome in the following manner. Before combination of the three sheets, an oil of a low vapor pressure is applied to the opposed surfaces of the first and second spiral Fresnel sheets 1, 3. More specifically, the surfaces are wiped with a cloth impregnated with silicone oil, whereby there is attained sufficient resistance.

There also is the problem that if a gap of about 5 mm or larger is formed in the three-sheet construction, the imaged plane will be seen overlappedly. Particularly, with change in humidity caused by the change in the outside air, a thin sheet 1 mm or less in thickness is apt to warp concavely or convexly. It takes about two days from the time when moisture begins to permeate the surface of an acrylic sheet about 0.5 mm in thickness until when it reaches the back of the sheet through a diffusion process. In that transient period, the surface side of the sheet contains a larger amount of moisture than on the back side thereof, so the surface side expands in a relative manner and consequently expands convexly outwards, forming a gap between it and the thick sheet 1. This has caused no problem in the conventional consumer projector using a thick and hence strong sheet having a thickness of about 1.5 mm or more. The above problems involved in the three-sheet construction of high fineness are overcome as follows.

The thickness of the first spiral Fresnel sheet is set at a value not smaller than about 2 mm, typically 3 mm as shown in the foregoing table, so as to have sufficient strength against changes in humidity. Further, the sheet is initially formed into a cylindrical shape centrally concaved several millimeters.

The first and second sheets 2, 3 are thin, 0.5 mm in thickness, so are weak against changes in moisture of the outside air. Therefore, they are initially formed into the shape of a cylinder or elliptic cylinder having a radius of curvature of about 30 cm, as indicated at 2 and 3 in FIG. 11. Then, as shown in FIG. 12, these three sheets are fitted in a screen frame which is substantially a single plane, whereby they come into close contact with one another. Moreover, an elastic pressure acts continually in the arrowed direction in the same figure, so even when a stress acting in an expanding direction toward the monitor side (right-hand side in the figure) is exerted on the sheets 2 and 3 with a transient change in humidity of the outside air, the aforesaid elastic pressure will overcome such stress to maintain the mutual close contact at all times.

The law of nature which governs the above environmental resistance is shown quantitatively as follows in terms of a relation between the thickness t of the sheets 2, 3 and the radius of curvature R in FIG. 11 in general applications.

Figure 13:
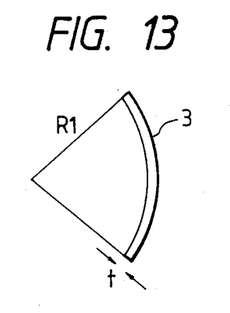

The difference in linear expansion coefficient caused by the difference in humidity between the surface and the back of each of the sheets 2 and 3 is assumed to be $\epsilon$. In case of an ordinary acrylic material, the value of $\epsilon$ is of the order of about $6 \times 10^{-4}$ relative to a humidity difference of 15%. The surface-back expansion coefficient difference $\epsilon$ acts as a stress to change the curvature of the sheet surface microscopically by $\epsilon/t$ in two dimensions at various points of the sheet surface. If the reciprocal of such change in the curvature, i.e. radius of curvature, is $R_1$ as shown in FIG. 13.

$$\frac{1}{R_1} = \frac{\epsilon}{t}$$

Figure 11:
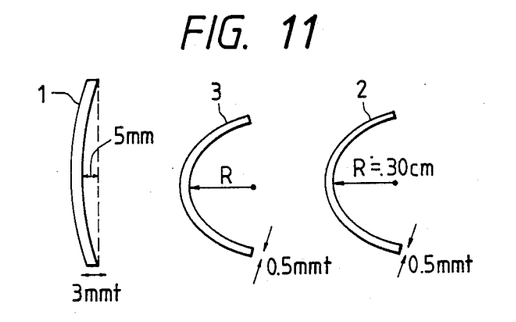
FIGS. 11, 12 and 13 are explanatory views of a screen construction.
Figure 12:
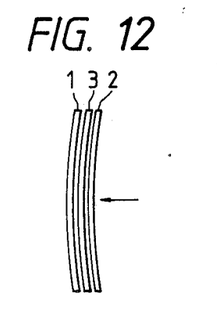

It is necessary that the initial one-dimensional radius of curvature (one dimension and two dimensions correspond to cylindrical and spherical curvatures, respectively) in FIG. 11 be set to half or less of the aforementioned $R_1$. The reason is that if $R = R_1$, this will cause warping on the opposite side in the direction orthogonal to the initial cylindrical shape shown in FIG. 11. If R is set equal to $R_1/2$, the elastic force based on the said initial cylindrical shape and a microscopic spherization stress based on humidity stress are combined together to develop a microscopic saddle-forming stress, which stress, however, does not lead to the expansion of the sheets 2 and 3 toward the monitor side. A concrete value of R is determined as follows:

$$R \leq \frac{t}{2\epsilon} = \frac{0.5 \text{ mm}}{2 \times 6 \times 10^{-4}} = 42 \text{ cm}$$

It is apparent from the above process of physical analysis that the axis direction of the initial cylinder may be any of longitudinal, transverse and oblique directions.

Further, by disposing the screen 10 in an upwardly inclined state by several degrees, it is possible to minimize the formation of a gap in the above three-sheet construction.

Description has been made above about measures against the change in humidity. As to the change in temperature, this will cause no problem because the thermal diffusion constant of the acrylic material is as high as 10 sec/mm$^2$.

Although a spiral Fresnel sheet is used in this embodiment, it may be substituted by a concentric Fresnel sheet.

Figure 14A:
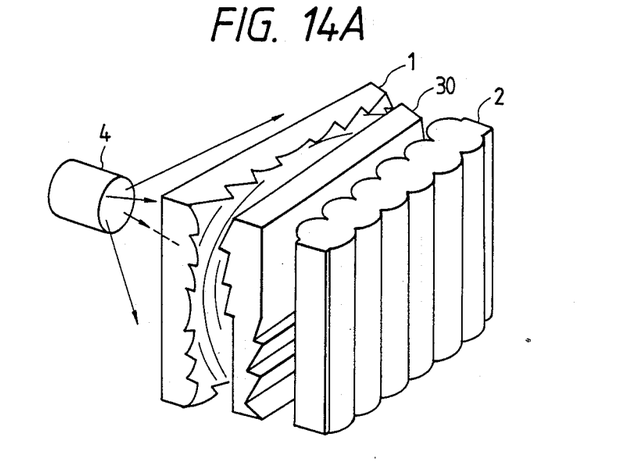
FIG. 14A is a perspective view of a third embodiment of the present invention.

FIG. 14A is a perspective view showing a construction according to a third embodiment of the present invention, in which a Fresnel sheet 1, a lenticular sheet 2 and a projection source 4 are the same as in the previous embodiment, and the numeral 30 denotes a linear Fresnel sheet.

The linear Fresnel sheet 30 has linear Fresnel lens surfaces formed on its upper half incidence side and lower half exit side.

Figure 14B:
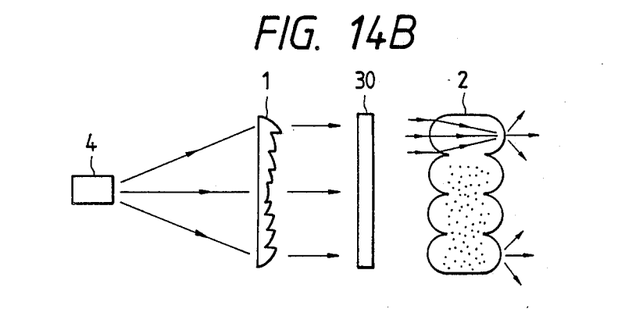
FIG. 14B is a horizontal sectional view of FIG. 14A.

FIG. 14B is a horizontal sectional view of FIG. 14A. In the same figure, light emanating from the projection source 4 macroscopically toward the marginal portion of the screen is converted to macroscopic parallel rays by the spiral Fresnel sheet. Since the linear Fresnel sheet 30 does not refract light in the horizontal direction, the light rays pass through it. Then, the lenticular sheet 2 diffuses the light rays over a wide range not smaller than $\pm 30°$ in the horizontal direction, so that the exit light has substantially a uniform directionality over $\pm 30°$ or more right and left.

Figure 14C:
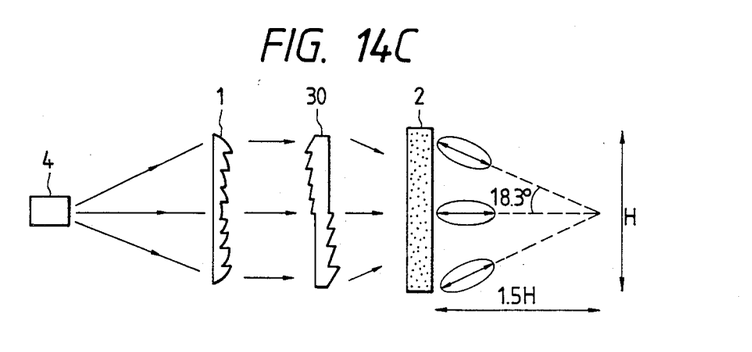
FIG. 14C is a vertical sectional view of FIG. 14A.

In FIG. 14C, which is a vertical sectional view of FIG. 14A, the light from the projection source 4 is converted to a collimated beam or parallel rays macroscopically by the spiral Fresnel lens 1 and then converted to a converted beam macroscopically by the linear Fresnel lens 30. The F number of the linear Fresnel lens 30 is set to about $1.5 \times$ so as to converge the beam at a distance 1.5 times the screen height H. The converged beam is then diffused in a range of about $\pm 8°$ by a powdered diffusing material such as $SiO_2$ contained in the lenticular sheet 2.

Figure 15:
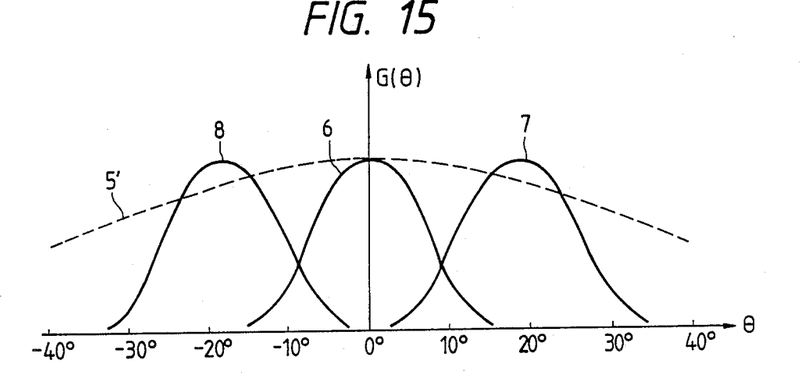
FIG. 15 is a graph showing typical directionalities in the construction illustrated in FIG. 14A.

FIG. 15 is a graph showing typical directionalities in the construction illustrated in FIG. 14A. In the same figure, a dotted line 5' represents a horizontal directionality, which is almost uniform at the central and marginal portions of the screen. A solid line 6 represents a vertical directionality at the central portion of the screen, and solid lines 7 and 8 represent vertical directionalities at the upper and lower portions of the screen. The angle 0° on the axis of abscissa means the normal direction of the screen. The graph indicates that at the upper and lower portions of the screen, the exit light is in a direction of ±18.3° in a corresponding relation to the exit-side conjugate point (convergent point) of 1.5H shown in FIG. 14C. Therefore, the monitor positioned at the conjugate point of 1.5H can see the whole of the screen, including the marginal portion thereof, at a uniform luminance.

Conversely, when the display device of this embodiment is monitored from afar, the upper and lower portions of the screen are seen in nearly deep black. But this is allowable because such a way of use is actually not adopted.

In the specification of the foregoing U.S. patent it is described that the exit-side conjugate point is shifted to a finite monitoring position of about 6H to 8H by strengthening the power of the spiral Fresnel sheet. According to such technique, however, it is inappropriate to shift the exit-side conjugate point to a position of 4H or less although it is possible to realize a positional shift to about 6H. This is as previously noted.

The relation between the Fresnel sheet prism angle $\alpha$ and refraction angle $\theta$ is as explained in connection with FIGS. 4, 5, 6 and 7.

Figure 16A:
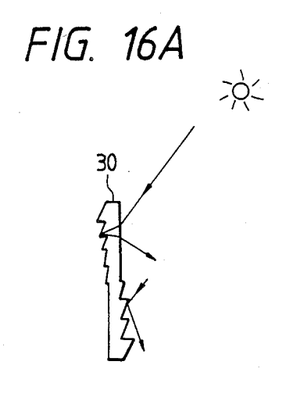
FIGS. 16A and 16B are views explanatory of the reflection of illumination light from linear Fresnel sheets.

As is seen from the shape of the linear Fresnel sheet 30 shown in FIG. 14C, the light from the light source for ambient illumination, which is disposed usually above the monitor, is reflected downwards as shown in FIG. 16A, so there is no fear of contrast deterioration. If a linear Fresnel lens surface is formed, for example, only on the exit side, the reflected light returns to the monitor side as indicated at 30' in FIG. 16B, thus resulting in contrast deterioration.

Of course, also in this embodiment, the part of the reflected light from the surface of the spiral Fresnel sheet 1 in FIG. 14C returns to the monitor side. This component is unavoidable also in the conventional two-sheet type screen, provided the shape of the spiral Fresnel lens does not permit the contrast deterioration to occupy six lateral band like areas on the screen, the contrast deterioration being limited to a small area near the upper central portion of the screen. Therefore, the influence thereof is to a slight degree.

Figure 17:
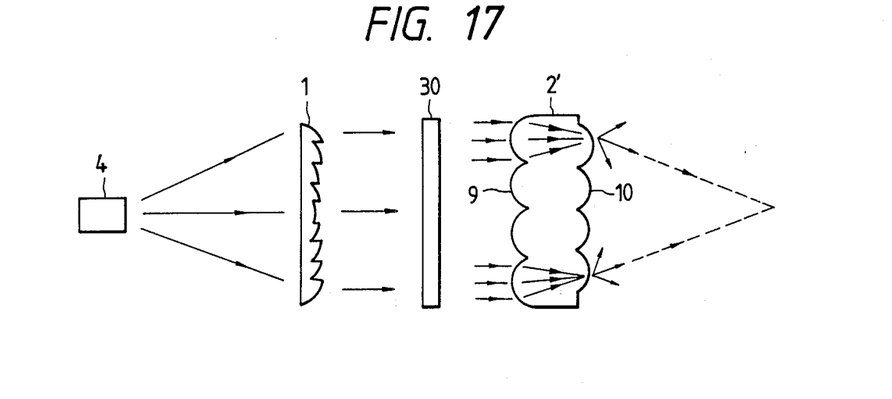
FIG. 17 is a perspective view of a fourth embodiment of the present invention.

FIG. 17 is a horizontal sectional view of screen components according to a fourth embodiment of the present invention. In the same figure, a spiral sheet 1 and a linear Fresnel sheet 30 are the same as in the first embodiment, and the numeral 2' denotes a lenticular sheet, in which the pitch of an exit-side lenticular lens 10 is made smaller than that of an incident surface 9. Consequently, a horizontal converging action is developed on the exit surface and centroid rays are converged to a finite conjugate point where the monitor is positioned. As a result, the uniformity of the screen as seen from the monitor is improved to a greater extent than in the third embodiment. Vertical directionalities in the fourth embodiment are the same as in the third embodiment.

Usually, the screen components 1, 2, 3, 2', 30 and 30' are formed using acrylic material. The material is formed into desired shapes using so-called molds. To make the molds, there is used a hard cutter typical of which is a diamond cutter. But the hard cutter involves the problem that it is apt to be broken during cutting. The linear Fresnel sheet used in the present invention, as one of merits thereof, permits the use of a cutter of a strong structure for that purpose. This is for the following reason.

Figure 16B:
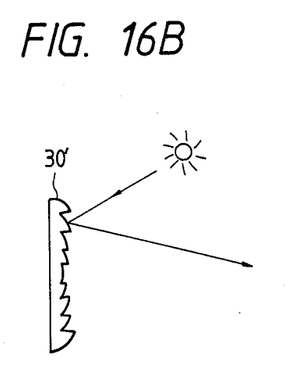
Figure 18:
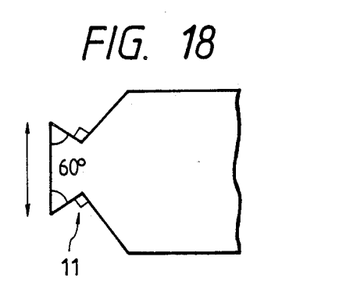
FIGS. 18 and 19 are explanatory views of cutters for cutting a linear Fresnel lens.
Figure 19:
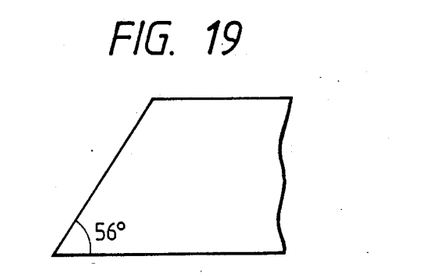

In order to obtain the one-side linear Fresnel lens indicated at 30' in FIG. 16B it is necessary to use such a symmetric cutter having a constricted front end as shown in FIG. 18. But this cutter is apt to be broken at the constricted portion. On the other hand, for obtaining the linear Fresnel sheet indicated at 30 in FIG. 16A, it is possible to use a strong cutter of such a shape as shown in FIG. 19 although it is required to use a total of two molds for the surface and the back.

The following table shows typical numerical examples of the sheets which constitute the present invention.

|  | External form | Thickness | Pitch |
| --- | --- | --- | --- |
| Spiral Fresnel sheet (1) | 80 cm × 60 cm | 3 mm | 0.113 mm |
| Lenticular sheet (2, 2') | 80 cm × 60 cm | 0.5 mm | 0.4 mm |
| Linear Fresnel sheet (30, 30') | 80 cm × 60 cm | 0 5 mm | 0.4 mm |

The other details are designed according to the foregoing equations (1), (2) and the specification of the foregoing U.S. patent.

According to the present invention, as set forth hereinabove, the projection type display technique which has heretofore been considered employable only for long distance monitoring is improved whereby it is made possible to provide an $A_1$-size projection type display device of high fineness for short distance monitoring contrary to the conventional common sense. As to the picture quality thereof, it is possible to overcome the drawbacks of the conventional direct viewing type display device in point of luminance, contrast, focus and uniformity of the picture plane. The projection type display device of the present invention possesses excellent advantages in point of power saving and human engineering. It also possesses an advantage of being strong against vibrations in transport and changes in humidity of the outside air. Further, the luminance of the entire picture plane is maintained uniform and there is little contrast deterioration caused by extraneous light even when the screen is monitored at a short distance within about twice, preferably about 1.5 times, the screen height. Additionally, by imparting a concave lens characteristic to the Fresnel lens surface, the width of the incident light absence area on the light incident side of a both side lenticular lens is reduced to a remarkable extent, thus greatly contributing to the reduction of moiré interference in a back projection type display device of high fineness. Thus, it is possible to provide a projection type display device of high fineness having such various effects and suitable for a personal work station.

What is claimed is:

1. A projection type display device for short distance monitoring wherein images based on light projected from a projection source are formed on a screen, said screen comprising a first Fresnel sheet means, a second Fresnel sheet means and a lenticular sheet means, which are arranged successively in this order from a light incidence side toward a light exit side, wherein said first Fresnel sheet means has a Fresnel lens surface on the light exit side, the sheet surface of said first Fresnel sheet means has a microscopically concave portion to diffuse light microscopically in a range within about 10°, and said second Fresnel sheet means has a Fresnel lens surface on the light incidence side and converges a principal portion of the exit light so that a light exit-side conjugate point thereof is at a distance within about twice the height of the screen.

2. A projection type display device for short distance monitoring wherein images based on light projected from a projection source are formed on a screen, said screen comprising a first Fresnel sheet means, a second Fresnel sheet means and a lenticular sheet means, which are arranged successively in this order from a light incidence side toward a light exit side, wherein said second Fresnel sheet means has a linear Fresnel lens surface on the light incidence side of its upper half portion and also has a linear Fresnel lens on the light exit side of its lower half portion, and a centroid light exit-side conjugate point with respect to the vertical direction is set at a distance within about twice the height of the screen.

3. A projection type display device according to claim 2, wherein said first Fresnel sheet means is a spiral Fresnel sheet.

4. A projection type display device according to claim 2, wherein said first Fresnel sheet means is a concentric Fresnel sheet.

5. A projection type display device wherein images based on light projected from a projection source are formed on a screen, said screen comprising a Fresnel sheet means, a lenticular sheet means for vertical diffusion and a both-side lenticular sheet means for horizontal diffusion, which are arranged successively in this order from a light incidence side to a light exit side, said Fresnel sheet means having a Fresnel lens surface on the light exit side and each lens surface thereof being formed as a concave surface to exhibit a refracting action thereby reducing the width of a lightless area at a light exit portion of said Fresnel lens surface to 50% or less on a light incidence surface of said both-side lenticular sheet for horizontal diffusion.

* * * * *